United States Patent
Dey et al.

(10) Patent No.: US 10,097,649 B2
(45) Date of Patent: Oct. 9, 2018

(54) FACILITATING LOCATION OF AND INTERACTION WITH A CONVENIENT COMMUNICATION DEVICE

(71) Applicant: International Business Machines Corporation, Armonk, NY (US)

(72) Inventors: Kuntal Dey, New Delhi (IN); Seema Nagar, Bangalore (IN); Roman Vaculin, Bronxville, NY (US)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 14/808,562

(22) Filed: Jul. 24, 2015

(65) Prior Publication Data
US 2017/0026974 A1 Jan. 26, 2017

(51) Int. Cl.
*H04W 72/06* (2009.01)
*H04L 29/08* (2006.01)
*H04W 4/02* (2018.01)
*H04M 1/00* (2006.01)
*H04W 8/00* (2009.01)
*H04M 3/54* (2006.01)

(52) U.S. Cl.
CPC ............ *H04L 67/22* (2013.01); *H04M 1/006* (2013.01); *H04W 4/025* (2013.01); *H04M 3/54* (2013.01); *H04W 8/005* (2013.01)

(58) Field of Classification Search
None
See application file for complete search history.

(56) References Cited

U.S. PATENT DOCUMENTS

| 8,428,240 B2 * | 4/2013 | Cadiz | H04M 3/54 379/211.02 |
| 2004/0102188 A1 * | 5/2004 | Boyer | H04B 7/18506 455/422.1 |
| 2013/0273896 A1 * | 10/2013 | Toner | H04M 3/42263 455/417 |

FOREIGN PATENT DOCUMENTS

EP 2192756 A1 6/2010

OTHER PUBLICATIONS

"Your Business Phone Service in the Cloud," https://www.phone.com, 5 pages (Jul. 22, 2015).
"Your Complete Cloud Communications System," http://www.ringcentral.com, 5 pages (Jul. 22, 2015).

* cited by examiner

*Primary Examiner* — Vinncelas Louis
(74) *Attorney, Agent, or Firm* — Rahan Uddin; Ryan, Mason & Lewis, LLP

(57) ABSTRACT

A method includes the following steps. A request is received to locate one or more convenient communication devices for a recipient of an interaction request. A command is issued to search for the recipient at one or more communication devices. Information related to the recipient is received from the one or more communication devices. A convenience score is computed for each of the one or more communication devices based on the received information. The interaction request is forwarded to one of the one or more communication devices based on the one or more computed convenience scores.

20 Claims, 7 Drawing Sheets

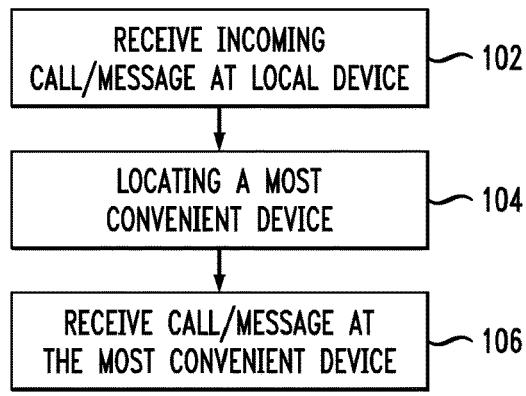
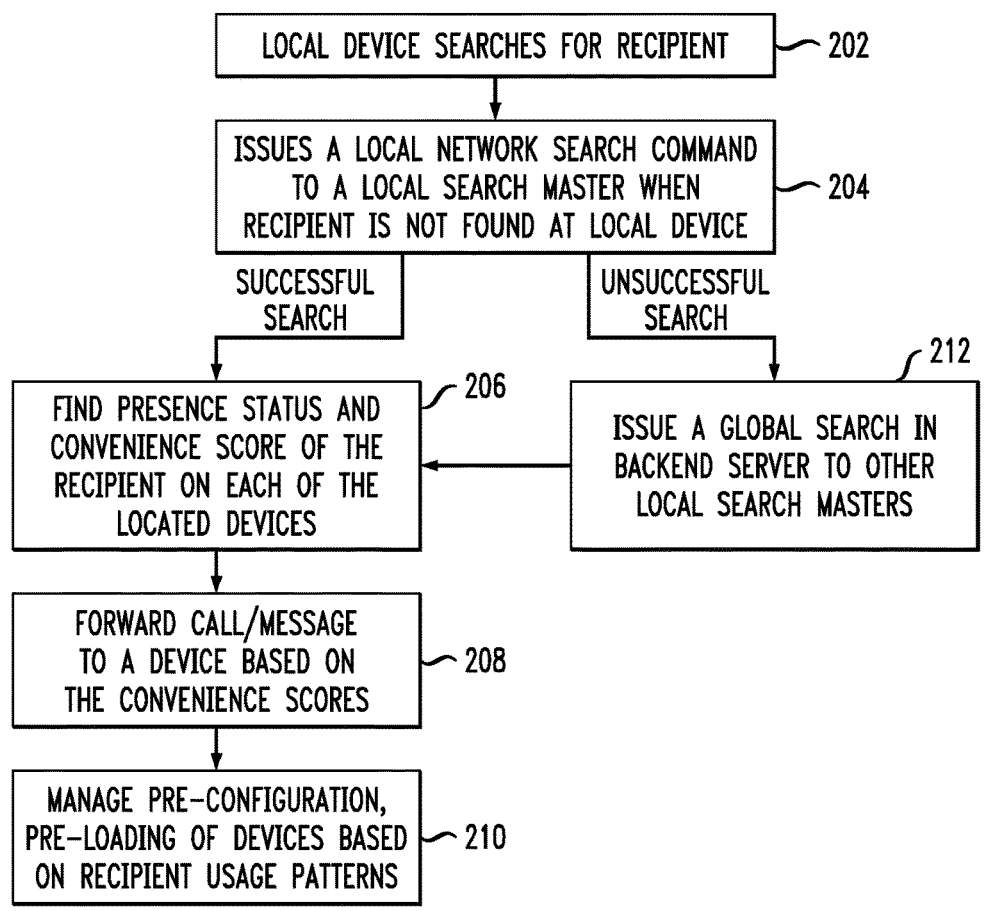

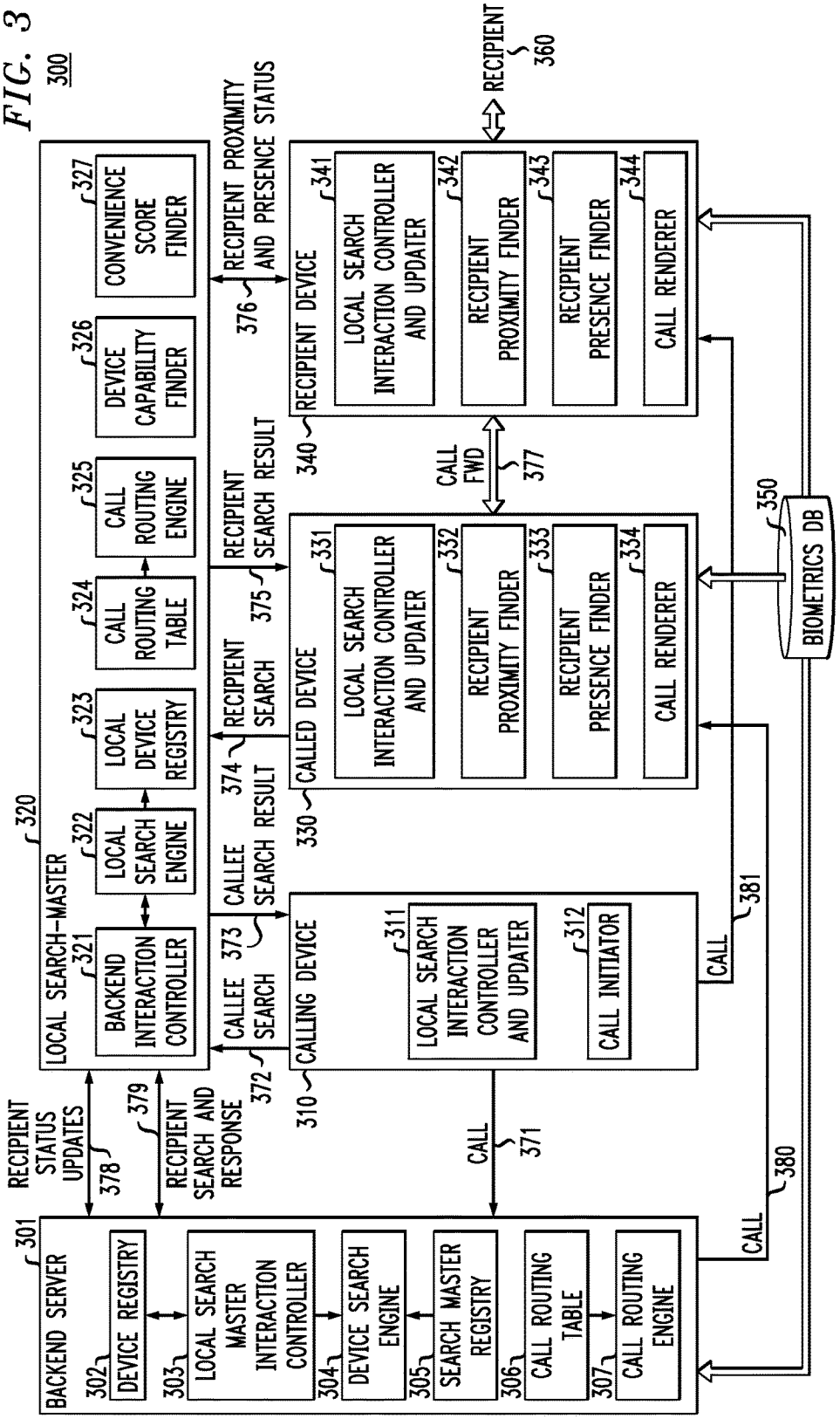

400

FACILITATING LOCATION OF AND INTERACTION WITH A CONVENIENT COMMUNICATION DEVICE

FIELD

The present application generally relates to communication systems and, more specifically, to locating and interacting with communication devices in such communication systems.

BACKGROUND

When a person wants to interact with a device, for instance, to receive a phone call or an instant message on a mobile device, the person needs to be explicitly assigned to a particular device and needs to be within reach of that particular device. For example, the phone needs to be present in the person's immediate environment, because only a phone can receive and forward calls to any other device using Bluetooth®/near field communication (NFC)/backend techniques. If a person forgets to carry his/her phone, then it is difficult, if not impossible to call, or receive the call by forwarding it to any device that he/she is close to.

SUMMARY

Embodiments of the invention provide techniques for locating and interacting with a device that is convenient to a user.

In one embodiment, a method comprises the following steps. A request is received to locate one or more convenient communication devices for a recipient of an interaction request. A command is issued to search for the recipient at one or more communication devices. Information related to the recipient is received from the one or more communication devices. A convenience score is computed for each of the one or more communication devices based on the received information. The interaction request is forwarded to one of the one or more communication devices based on the one or more computed convenience scores.

In another embodiment, a method comprises the following steps. An interaction request is received from a first communication device. A search is made for a recipient of the interaction request. A search command is issued, in response to the recipient not being found after the searching step, to a local search module to search for one or more communication devices convenient to the recipient. An identity of a communication device is received based on one or more convenience scores. The interaction request is forwarded to the identified communication device.

In yet another embodiment, a method comprises the following steps. A request is received to search for a recipient of an interaction request. A search is made for the recipient. Proximity and presence information related to the recipient are collected based on the searching step. The collected information is sent to one or more local search modules. The interaction request is received in response to being identified as a convenient communication device based on the collected information.

BRIEF DESCRIPTION OF THE DRAWINGS

FIG. 1 depicts a most convenient device locating method, according to an embodiment of the invention.

FIG. 2 depicts an overview process of the location step of FIG. 1, according to an embodiment of the invention.

FIG. 3 depicts a most convenient device locating system architecture, according to an embodiment of the invention.

DETAILED DESCRIPTION

Figure 4:
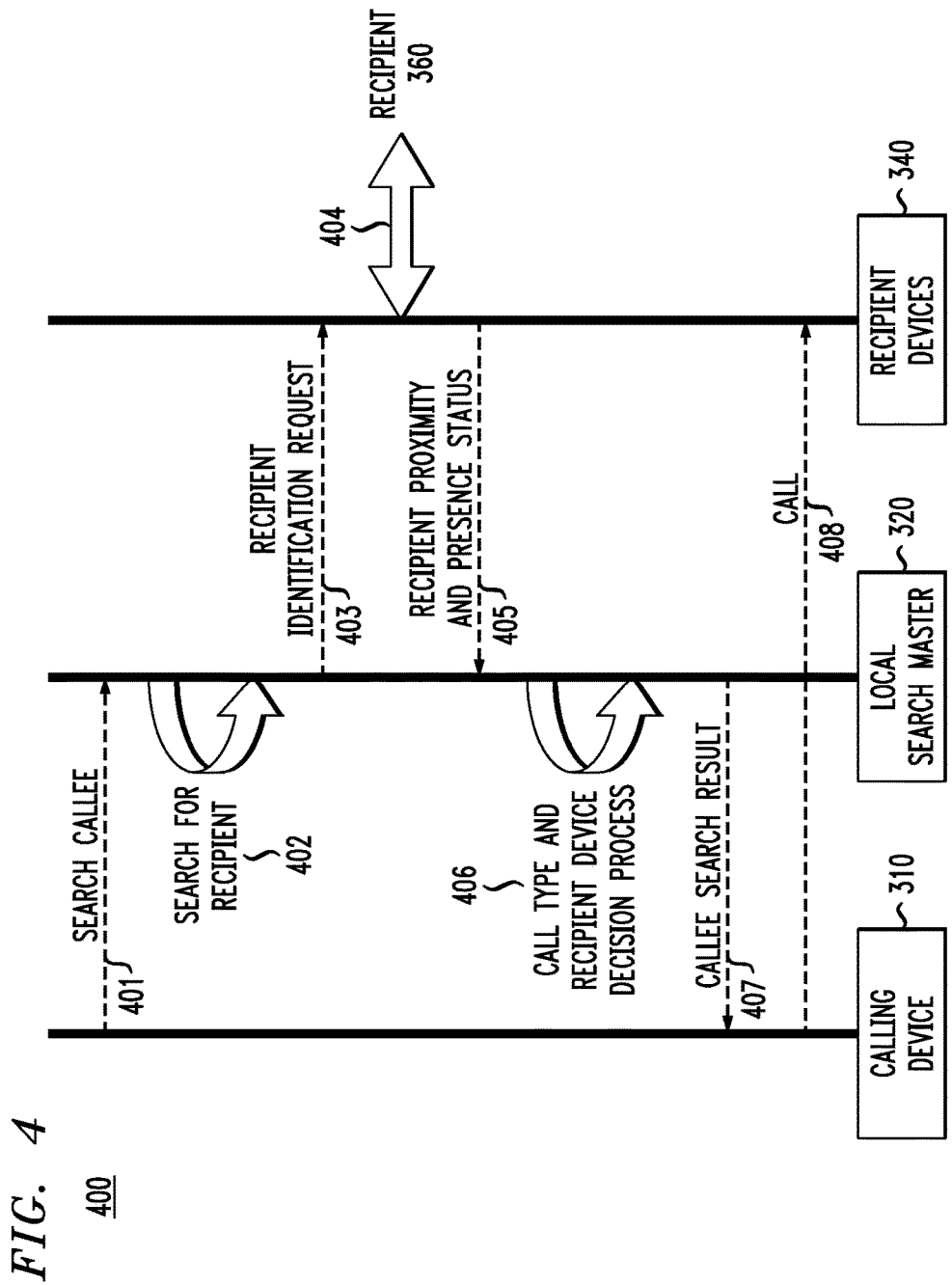
FIG. 4 depicts an exemplary workflow diagram for implementing the method of FIG. 2, according to an embodiment of the invention.

Illustrative embodiments of the invention may be described herein in the context of illustrative methods, systems and devices for location of and interacting with a device that is convenient for a user. However, it is to be understood that embodiments of the invention are not limited to the illustrative methods, systems and devices but instead are more broadly applicable to other suitable methods, systems and devices.

As used herein with respect to FIGS. 1-5, a "device" refers to a communication device capable of receiving and sending visual, textual and/or acoustic data. A device may be, for example, but not limited to, a mobile phone, a tablet, a computer, a gaming system and a television.

As used herein "most convenient device" or "convenient device" refers to a device that is closest in proximity to a user, a device with functions suitable for a specific type of interaction (e.g., a voice call, video call, text message), and/or a device that is preferred by a user.

Embodiments provided herein envision a system in which a person can receive and place calls or perform other types of interactions on any device that is conveniently located relative to the person (e.g., in close proximity to the person). Furthermore, the device is capable of recognizing the user automatically and handling secure automated identification and authentication, while the overall system handles local network search, backend routing and calls and other identity related interactions.

Conventionally, when a person receives a call or message (e.g., text message, video message, etc.), there are limited ways to forward the call or message. For example, calls may be forwarded to a pre-configured number or a radio of a car using Bluetooth® technology, alerts may be sent to a pre-configured email address. However, the underlying assumption is that the mobile phone is part of the environment, e.g., the person is carrying his phone with him. As another example, when using "find me follow me" applications, the "find me" application allows a user to receive calls at any location, and the "follow me" application allows a user to receive calls at any number of telephone numbers. However, Location Based Call Redirect techniques, such as the "find me follow me" technique, forward calls to appropriate fixed line number based on current location, which requires a number for forwarding to be pre-established for a particular location.

Existing techniques for interaction with devices (e.g., call forwarding) requires that the phone be present in the ecosystem, that is, only a phone can receive and forward calls to any other device using Bluetooth®/NFC/backend techniques. Moreover, existing systems and methods do not manage phone call routing by detecting and pre-configuring the device that the call recipient is nearest to (e.g., based on proximity of call recipient to device), with respect to the desired call modality/type, device capabilities and presence status of the call recipient.

Embodiments provided herein forward calls based on a device that is most convenient for the recipient (e.g., is nearest to recipient), not necessarily his mobile phone. The nearest device may be found using a local network search of Internet of Things (IoT) devices. As such, a user does not need to carry his cellphone all the time. For example, a user's cellphone could be at home while the user is in the gym. Embodiments provided herein allow a call to his/her cellphone to be forwarded to a gym machine that is nearest to the user, i.e., the most convenient device for the user. Advantageously, there is no need for a number to be pre-configured corresponding to a location.

Embodiments provided herein maximize the ease of an individual interacting with one or more devices (e.g., placing calls) and maximize the chances of an individual to interact with the most convenient device (e.g., of being able to route calls to the most convenient device for an individual), irrespective of cell phones being carried or not, using, for example, IoT, identity recognition, local network search and backend routing system.

Embodiments provided herein also minimize overall system load by having multistep lookup granularities, such as local and global searches, and dynamic status updates. Furthermore, embodiments provided herein also aim to maximize reach by invoking the search at an appropriate granularity, dynamically setting the search granularity at runtime. Embodiments provided herein allow users to communicate without exposing their phone numbers to the other party (identity based calls), and allow the system and the relevant devices to be dynamically pre-configured and pre-loaded based on the users roaming and anticipated interaction of the roaming individuals with the devices. Embodiments herein provide a system and associated methods that will allow an individual to interact, e.g., to make calls from and receive and render calls to, a set of devices that are most convenient for each given call/interaction.

FIG. 1 depicts a most convenient device locating methodology 100, according to an embodiment of the invention. At step 102, an incoming call or message is received at a local device, such as a mobile phone. At step 104, the most convenient device locating system searches for a device, other than the local device, that is most convenient for the intended recipient. For example, the most convenient device may be a device that is closest in proximity to the recipient, or one that is most suited to receive the incoming call/message. That is, if the incoming call is a video chat request, a computer would be preferred over a fax machine even if the fax machine is closer in proximity to the recipient. Then at step 106, the incoming call is forwarded to the most convenient device located after step 104.

FIG. 2 delineates a process 200 used at step 104 of FIG. 1 in the search by a most convenient device locating system. At step 202, the local device searches for the recipient. Then after sensing that the recipient is not near the local device (or local device rings through till a natural ring timeout occurs), at step 204, the local device issues a local network search command to a local search master to lookup the devices that the recipient is close to in order to compute proximity of user with respect to the device. If the search is successful, at step 206, the presence status and convenience score of the recipient is determined for each of the located devices. The convenience score may be computed based upon the device capabilities, user presence status, proximity of user with respect to device, and the type/modality of the received call. That is, the convenience score is computed based on: 1) proximity; 2) characteristic of the device; and 3) nature of the call. Further details of the convenience score computation will be provided in the context of FIG. 3 below. Then at step 208, the incoming call is forwarded and rendered to a device based on the convenience scores, e.g., a device with the highest convenience score with respect to the recipient and the incoming call. For example, if the device with the highest convenience score with respect to a given call for a recipient happens to be a television that the recipient is watching, then the call is rendered on the television. The voice is rendered on the television, and optionally any associated photo is also shown on the television screen. If the given call is a video call, then video is also shown at the television. At step 208, predictive pre-configuration and pre-loading of the devices may be managed based on users' roaming patterns, convenience scoring, and/or anticipated individual interaction patterns. For example, if a user approaches the smart television device and it is typically the case that this particular user interacts using video teleconferencing, the system preemptively downloads the necessary video compression codecs and end-user application from the application-store and installs it on the device.

Referring back to step 204, if the search was unsuccessful and the recipient is not found near any devices registered with or in the vicinity of the local search master, then at step 212, a global search is issued in a backend server to one or more other local search masters. Then the process goes back to step 206, and steps 206-210 are repeat across one or more other local search masters on which the recipient has recently been seen.

FIG. 3 depicts an illustrative system architecture for the most convenient device locating system, according to an embodiment of the invention. System 300 includes backend server 301, calling device 310, local search master 320, called device 330, recipient device 340 and biometrics database (DB) 350.

The backend server 301 comprises a device registry 302, a local search master interaction controller 303, a device search engine 304, a search master registry 305, a call routing table 306 and a call routing engine 307. Device registry 302 is a registry of all communication devices and gateways, comprising of device identifiers and device types. It may contain entries for entities like mobile phones (phone numbers), televisions, computers, local search masters and other suitable computing devices, local search master identifiers (that identifies local search masters) etc. Local search master interaction controller 303 may be employed by the backend server to manage interactions and the communication protocol with one or more local search masters, such as local search master 320, e.g., for locating recipients. The protocol may use the device registry 302 to pass the device identity to local search master 320, along with the identifier for the caller, and receive responses. The responses may then be passed to device search engine 304. Device search engine 304 interacts with local search master interaction controller 303 and search master registry 305 when responding to a global search request (step 212 of FIG. 2), and thereby locates the recipient devices being searched. The output of this search is fed into call routing table 306. Master registry 305 comprises a registry of devices, which may be used to find a known device in part of the recipient search process. Call routing table 306 may comprise a table that keeps a record of which device a call is getting routed to, similar to the home location register (HLR)/visitor location register (VLR) tables in a traditional global system for mobile communications (GSM). Call routing engine 307 is a system that forwards a given call to the found target. Call routing table 306 and call routing engine 307 may be used to route a call from one device to another device, such as from calling device 310 to called device 330 (shown as paths 371 and 380). Backend server 301 may listen to call requests arising from local search master 320 and search for other local search masters using available information, such as time trails, to efficiently locate the intended recipient, and route the calls onto the appropriate local search master (or directly to a device, if a callee is sensed around a particular device). The backend server 301 may be, in an illustrative embodiment, a telecom server (e.g., Verizon or AT&T). In addition to performing the job of a traditional phone call router, backend server 301 is also capable of talking to one or more local search masters 320 for finding call recipients so as to route calls to those recipients, for example, through the local search master 320 on which the recipient was reported to be found. Notably, backend server 301 may periodically receive updates from one or more local search masters 320.

The local search master 320 comprises a backend interaction controller 321, a local search engine 322, a local device registry 323, a call routing table 324, a call routing engine 325, a device capability finder 326 and a convenience score finder 327. Backend interaction controller 321 may be used in managing interactions between local search master 320 and backend server 301, for example, managing the communication protocol for a recipient search with backend server 301, sending/receiving recipient status updates 378 and sending/receiving recipient search and response 379. Local search engine 322 is an engine that performs searches for recipient(s) within a local network, such as within a home or an office. Local search engine 322 may interact with both the backend interaction controller 321 and local device registry 323 for performing a local network search (e.g., step 204 of FIG. 2). Local device registry 323 may comprise a list of devices that are locally available to the local search master 320, these devices may be previously registered with the local search master 320. For example, within a house, locally available devices may include computers, televisions, the residents' mobile phones, gaming systems, and other suitable computing devices. Call routing table 324 comprises a table that keeps a record of which device a call is getting routed to, similar to HLR/VLR within a local network, when a user moves from one room or office to another, the call needs to be routed to the next device accordingly. Call routing engine 325 is a system that forwards a given call to the found target (e.g., the most convenient device). Call routing table 324 and routing engine 325 may be used to forward a call from one device to another, e.g., from called device 330 to recipient device 340 as indicated by path 377 or from calling device 310 to recipient device 340 as indicated by path 381. Device capability finder 326 comprises a module that finds which device near the recipient has what kind of capability in order to locate one or more devices with specific capabilities to serve an incoming interaction request. For example, an incoming call could be a video and voice call. If device capability finder 326 determines that the recipient is near a device (such as a TV) that has both video and voice capability, then the call will be received as a video call. However, if it determines that the recipient is near a device with only audio capabilities (such as a radio), then it will ignore the video modality and accept the call by converting it to a purely voice call. Convenience score finder 327 may be used to calculate a convenience score for each of the located devices (e.g., step 206 of FIG. 2). A convenience score may be in the form of a qualitative or quantitative rating scale, for example, a number scale. A convenience score for a device may be computed with respect to the device proximity of the recipient, the device feature set, the call feature set and the status of the recipient with respect to the device (e.g., closest in proximity to a computer, but recipient is detected as being on video conference at the computer). Furthermore, the convenience score is related to presence and time as well as other attributes: device type, status, battery, accessories, preference, personal historical usage, etc. The local search master 320 may be implemented in one of the registered local devices, implemented on a router, or it may be implemented as a separate unit serving a specific location.

The local search master 320 may interact with a calling device 310 by receiving a callee search request 372 and sending a callee search result 373. The local search master 320 may interact with a called device 330 by receiving a recipient search request 374 and sending a recipient search result 375. The local search master 320 may interact with a recipient device 340 by sending/receiving recipient proximity and presence status data 376.

For example, when a caller (calling device 310) makes a call, a callee search is issued to local search master 320 to search the local vicinity of the caller for the callee (recipient). Illustratively, if caller and callee are both in the same office building, then the local search master 320 within the office building would be able to locate the callee locally, either in the vicinity of the calling device 310, the called device 330 or any other recipient device 340, then send back callee search result 373 to calling device 310 and route the call from the caller to the callee at a most convenient device. Advantageously, the call may be routed without going to the back end. The local search master 320 will send back the billing info to the back end telecom service provider. This reduces the network traffic load, plus the caller may get some discounts in the call charge for not using the network. However, in the above example, if the local search master 320 within the office building is unable to locate the callee, it may then issue a global search command to a backend server 301. The backend server 301 will then look at its entry and route the call accordingly. This may further involve looking for the callee across one or more other local search masters (outside the office building) on which the callee was recently "seen" and "reported" to the backend server 301.

The calling device 310 comprises a local search interaction controller and updater 311 and a call initiator 312. The called device 330 comprises a local search interaction controller and updater 331, a recipient proximity finder 332, a recipient presence finder 333 and a call renderer 334. The recipient device 340 comprises a local search interaction controller and updater 341, a recipient proximity finder 342, a recipient presence finder 343 and a call renderer 344. Each of the local search interaction controller and updater 311, 331 and 341 may be used to interact with local search master 320. Each of the recipient proximity finder 332 and 342 may be used in locating the intended recipient, for example using techniques to compute proximity relationships between devices and people, e.g., computing spatial relationship of a given person with respect to a given device. Each of recipient presence finder 333 and 343 may determine recipient presence information using biometric-based recognition techniques (e.g., using data from biometrics DB 350), context sensors to sense location and locomotive states, etc.

Furthermore, IoT technology may also be employed in locating the intended recipient. Information gathered regarding the presence and proximity of the device relative to the recipient are send to the associated local search master 320 for use in implementing the most convenient device locating methodology 100 described herein.

The biometrics DB 350 is a database for storing face, eyeball, voice, fingerprint recognition information or any other biometric-based recognition information for one or more users of the system 300, including recipient 360. The information stored in biometric DB 350 may be previously registered by the one or more users of the system 300, or dynamically received from one or more devices capable of interacting with biometrics DB 350. The information stored on the biometric DB 350 may be accessed by any one of the devices, such as backend server 301, called device 340, recipient device 340.

Alternative embodiments of the system 300 may comprise more or less functionally equivalent modules/components. For example, system 300 may comprise multiple local search masters 320 and/or multiple recipient devices 340. All modules/components can be integrated within a single system or within multiple systems which may be remotely located. It is to be understood that each of the modules/components within system 300 (e.g., backend interaction controller 321, local search and interaction controller updater 311, device registry 302, etc.) may be implemented using hardware, software or a combination of hardware and software running on one or more computing or other processing devices.

Advantageously, embodiments herein provide for predictive, dynamic system and devices pre-configuration and preloading based on the users roaming and anticipated interaction of the roaming individuals with the devices. Dynamic device pre-configuration and device pre-loading may be provided as a user is roaming and the devices are detecting the user proximity:

Based on the convenience score, the likely current device is identified where a possible interaction may occur.
   Based on typical interaction patterns of the user with the particular type of device (mined from the user's interaction history) and based on device capabilities, the likely interaction and required device configuration is determined. For instance, it is determined that the user typically makes video calls, rather than sending messages or making regular phone calls. Video codecs and video calling application are pre-loaded on the device and installed in the background, so as to be prepared in case the user decides to interact with the device. Later, when an interaction request is issued by either the global or local search, the device with the highest convenience score is going to be very likely pre-configured for the interaction.
   If the type of interaction is different than what is typical for a user, the device will be configured on-demand, leading to a possible delay, but not compromising the system.
   As part of this process, the devices will run clean-up process on a regular basis such that apps with low frequency of usage may be unloaded/removed.

Referring back to the figures, FIG. 4 depicts an illustrative workflow diagram for implementing the methodology 100 of FIG. 1 and process 200 of FIG. 2 using system 300 of FIG. 3. More specifically, FIG. 4 depicts a scenario where a local network search is performed. Workflow 400 starts at step 401, in which calling device 310 performs a callee search with local search master 320 (e.g., callee search 372 and of FIG. 3). Then at step 402, local search master 320 receives and performs a recipient search (e.g., recipient search 374). At step 403, a recipient identification request is sent to the recipient device(s) 340. At step 404, the recipient 360 is located with respect to one or more recipient devices 340. At step 405, the recipient device(s) 340 sends back recipient proximity and presence status data (e.g., recipient proximity and presence status data 376 in FIG. 3). At step 406, a process to determine the call type and recipient device is performed (e.g., determine highest convenience score). At step 407, callee search result is sent from local search master 320 to calling device 310 (e.g., callee search result 373 in FIG. 3). At step 408, the call from calling device 310 is routed to recipient device 340 (e.g., call forwarding 377 or call path 381 in FIG. 3).

For example, Alex rings Bob's phone number, but Bob is not near his smart phone. Bob's smart phone senses his absence, or alternatively, infers this after the phone rings through but is not picked up. Local search-master 320 has an entry in its records (e.g., maintained at call routing table 324, local search engine 322, local device registry 323 or other suitable components of the local search master 320) indicating that Bob has been spotted near his washing machine in the washing room. However, the local search-master has another entry, indicating that Bob has been spotted near his smart television (TV), with a more recent timestamp. The local search master issues a local search within Bob's household, pinging devices and activating them to sense/detect/look for Bob, for example, serializing in a reverse timestamp order (latest entry explored first). The search order could be the smart TV first, then the washing machine, and then other devices, based upon Bob's identification/presence timestamps observed in recent past (e.g., last few minutes/hours). Bob is found by his smart TV, as well as by his wife's mobile phone, though no longer near his washing machine. His presence status is "present" with respect to the TV, because he is not walking but is sitting idle on his sofa and watching the TV. His presence status is "inactive/intermittently active" with respect to his wife's mobile phone, as, in reality, he is exclaiming and uttering at times (which is heard by the mobile phone), but is quietly watching the TV show most of the time. Therefore, the TV would be assigned a higher convenience score with respect to other devices, such as his wife's phone and the washing machine. This information is relayed back to Alex (e.g., Alex's device). Thus, as Bob's convenience score to receive the phone call is the highest on the TV, the TV rings out, showing Alex's photo as the caller. If the call is not a video call, only a profile picture of Alex (if there is a profile picture associated with Alex) is shown on the TV, even though the TV is a device capable of showing visual data (such as a video). If the call is a video call, while Bob was roaming around, the system may determine which (if any) device may need to be pre-configured to receive the video call.

As another example, David is looking for Cate in their office building. David is not carrying his phone, but he is near his computer. He enters Cate's name (or speaks it out). This message reaches the local search-master installed in the office, which has a registry of users (e.g., employees) and user devices. Local search-master has an indication with a timestamp from the backend server that Cate was outside the office building in the morning, near the smart gate. However, local search master also has an indication of Cate being near her computer just five minutes ago. The local search master issues a local heuristic search within Cate's office, starting from her computer. Cate is located in front of her computer. However, her presence status indicates that Cate is taking an official call at her computer. Hence, the speakers on Cate's computer do not start ringing, rather a small pop up alert message is displayed on her screen which lets Cate know that David is looking for her.

Figure 5:
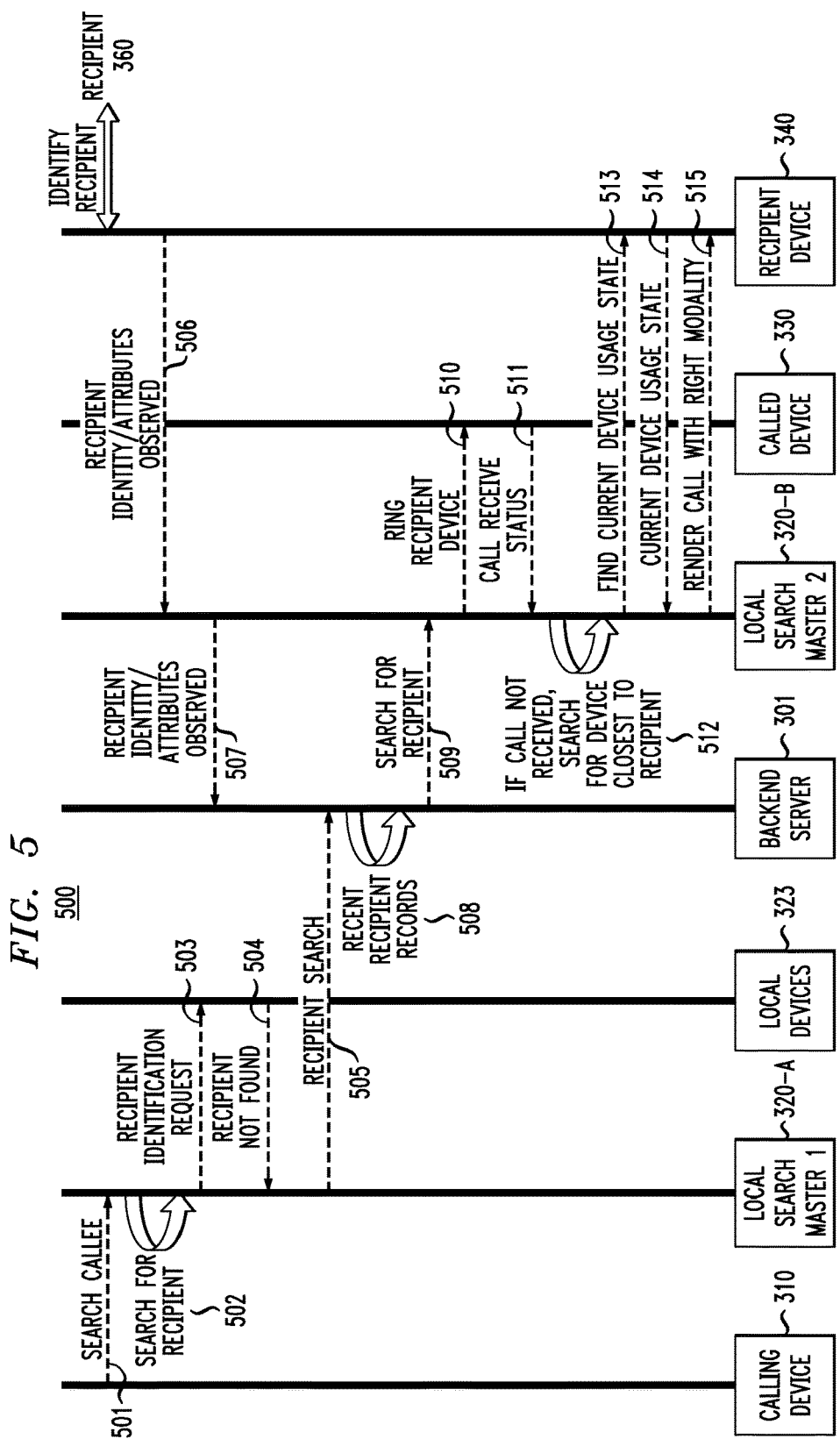
FIG. 5 depicts another exemplary workflow diagram for implementing the method of FIG. 2, according to another embodiment of the invention.

FIG. 5 depicts an illustrative workflow diagram for implementing the methodology 100 of FIG. 1 and process 200 of FIG. 2 using system 300 of FIG. 3. More specifically, FIG. 5 depicts a scenario where a global network search is performed. At step 501, a callee search is issued from calling device 310 to local search master 1 320-A. Then at step 502, a search for the recipient is performed by the local search master 320-A. At step 503, a recipient identification request is sent to local devices that are registered with local device registry 323. At step 504, it is determined that the recipient is not found near any of the local devices 323. At step 505, the local search master 1 320-A issues a recipient search (global search command) to backend server 301. At step 506, the recipient identity/attributes observed are received from the identified recipient 360 and sent to local search master 2 320-B, which in turn send the information to backend server 301 at step 507. Note that this information may be automatically updated periodically. At step 508, backend server 301 searches its recent recipient records, which is maintained at call routing table 306 or other components of backend server 301. Then at step 509, a search is issued to local search master 2 320-B to search for the recipient. At step 510, local search master 2 320-B rings the recipient device called device 330. At step 511, the call receive status is sent back to the local search master 2 320-B. At step 512, if the call was not received, then a search is performed for a device closest to the recipient. At step 513, current device usage state for one or more recipient devices 340 is found, and this information is then sent back to local search master 2 320-B at step 514. Then at step 515, the call is rendered with the right modality at a recipient device 340 based on the received current device usage state.

For example, Bob is travelling from New York to Chennai, he boards Air India, and then he realizes he forgot his smart phone at home. His wife makes a video call to him, and Bob's smart phone senses that Bob is not around the phone, or infers his absence when it rings through and Bob does not pick up. His smart phone issues a local search command to its associated local search master. Local search-master issues a search command to the local devices detected within the premises for Bob (e.g., Bob's house). The records present in the local search master are used to search for Bob in reverse timestamp order, to make the search potentially efficient. However, Bob is not found by any of these devices. The local search master then issues a global search command to the backend server. The backend server has three time-stamped entries: Bob was last found in (a) airport security check; (b) airport departure lounge; and (c) Air India flight seat. The backend server re-confirms with the latest timestamp entry, namely the Air India flight seat, and finds Bob is still there. Meanwhile, as soon as Bob is detected near the Air India seat's built-in smart device: it is determined that he typically interacts using video teleconferencing. In anticipation of possible video call, the device downloads the needed video conferencing application and pre-configures the system so that it can receive such calls. The smart phone then forwards the call to the device in front of his seat.

As another example, Cate calls up her son Eric from her phone. Eric is in the club gym, five miles away from home and is not carrying his smart phone. Eric's phone senses that Eric is not around (alternatively, it rings through without being picked up), and his smart phone issues a local search. Local search-master issues a search on the local devices (and uses the routing table), but the local search does not find Eric near any device. The local search master issues a global search to the backend server. The backend server has three time-stamped entries that Eric was last found in (a) his home (which is the same as his mother Cate's home); (b) in his car; and (c) in the club gym. The backend server re-confirms with the latest timestamp entry and attempts to find Eric in the club gym. The local search-master within the club gym starts a search for Eric. Erric is located near a treadmill machine in the club gym. Cate's call is forwarded to the treadmill machine. The treadmill machine starts ringing, as Cate's call is now routed to this treadmill. Eric is able to take the call using the treadmill's call receiving interface.

As yet another example, Alex is looking for Bob in the office. Alex is not carrying his phone, but he is near his computer, so he enters Bob's name into (or speaks it out to) his computer. This message reaches the local search-master installed in the office, which has a registry of users (employees) and user devices. The local search-master issues a search command on the local devices, detected to be currently within the office premises, for Bob, leveraging the routing table present in the local search master to make the search more efficient. However, Bob is not found by any of these devices. So the search is routed to the backend server as a global search command. The backend server has three time-stamped entries that for Bob that he was last found: (a) near the office smart gate in the morning; (b) near the office smart gate in the evening; and (c) in his car in front of the speakers at a time later than when she was found near the office smart gate in the evening. The backend server re-confirms with the latest timestamp entry, namely Bob's car speakers, and finds Bob is still there. Thus, effectively, Bob is located in her car, possibly driving at the moment. Hence, Bob's car speakers start speaking to let Bob know that Alex is looking for him. A communication channel gets established via the backend from Alex's computer to Bob's car speakers, and the communication takes place.

Embodiments of the present invention may be a system, a method, and/or a computer program product. The computer program product may include a computer readable storage medium (or media) having computer readable program instructions thereon for causing a processor to carry out aspects of the present invention.

Figure 6:
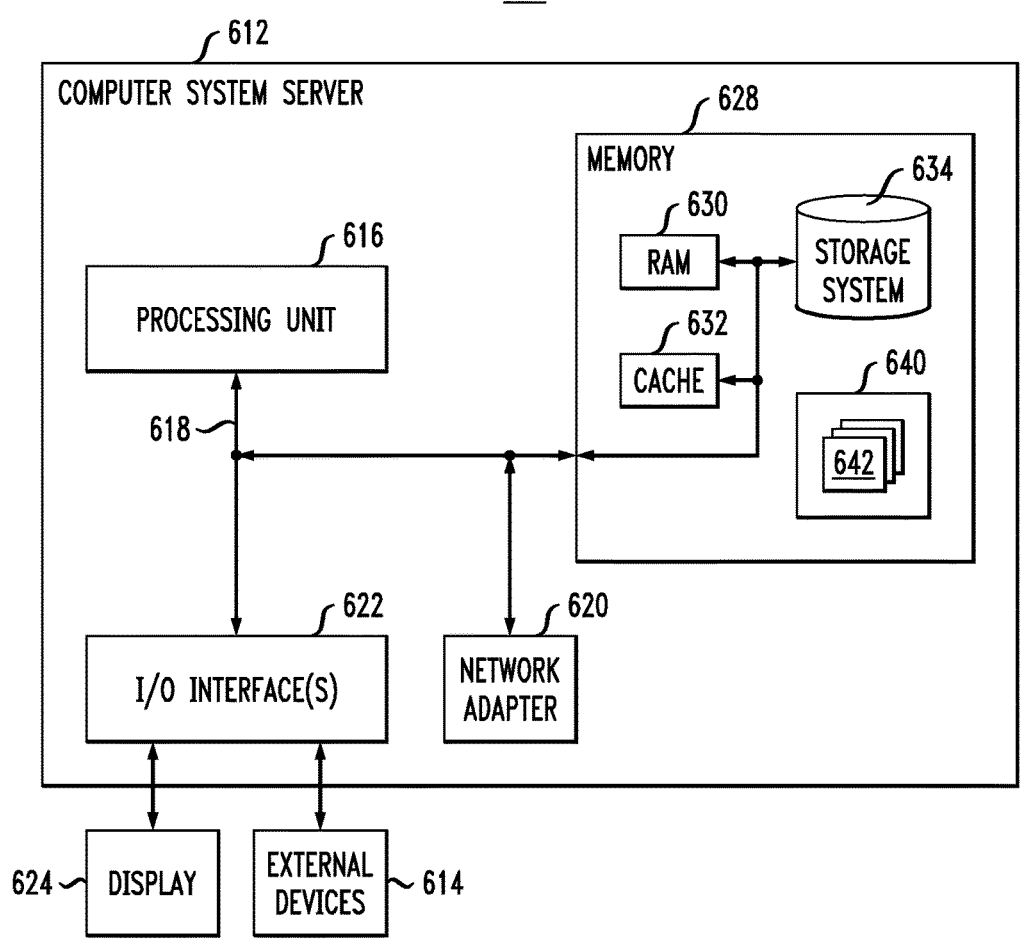
FIG. 6 depicts a computer system in accordance with which one or more components/steps of techniques of the invention may be implemented according to an embodiment of the invention.

Accordingly, the architecture shown in FIG. 6 may be used to implement the various components/steps shown and described above in the context of FIGS. 1-5.

Any combination of one or more computer readable storage medium may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 6, a schematic of an example of a cloud computing node is shown. Cloud computing node 610 is only one example of a suitable cloud computing node and is not intended to suggest any limitation as to the scope of use or functionality of embodiments of the invention described herein. Regardless, cloud computing node 610 is capable of being implemented and/or performing any of the functionality set forth hereinabove.

One or more embodiments can make use of software running on a general-purpose computer or workstation. In cloud computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

It is understood in advance that although this disclosure includes a detailed description on cloud computing below, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Computer system/server 612 in FIG. 6 is an example of a cloud computing node. It is to be appreciated, however, that the computer system/server 612 in FIG. 6 is only one example of a suitable cloud computing node and is not intended to suggest any limitation as to the scope of use or functionality of embodiments of the invention described herein. Regardless, the computer system/server 612 is an example of a cloud computing node capable of being implemented and/or performing any of the functionality set forth hereinabove.

Figure 7:
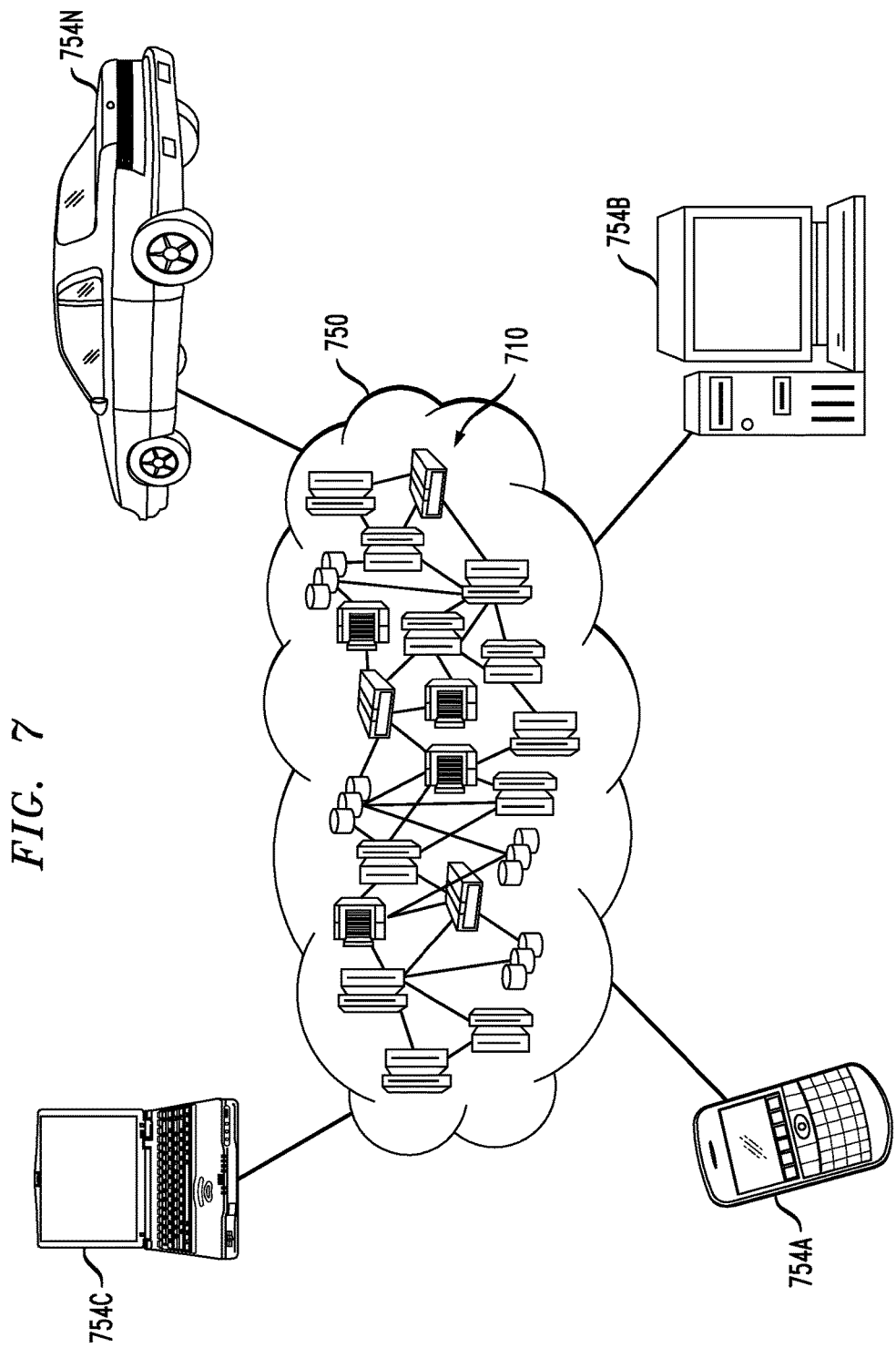
FIG. 7 depicts a cloud computing environment, according to an embodiment of the invention.

Referring now to FIG. 7, illustrative cloud computing environment 750 is depicted. As shown, cloud computing environment 750 comprises one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
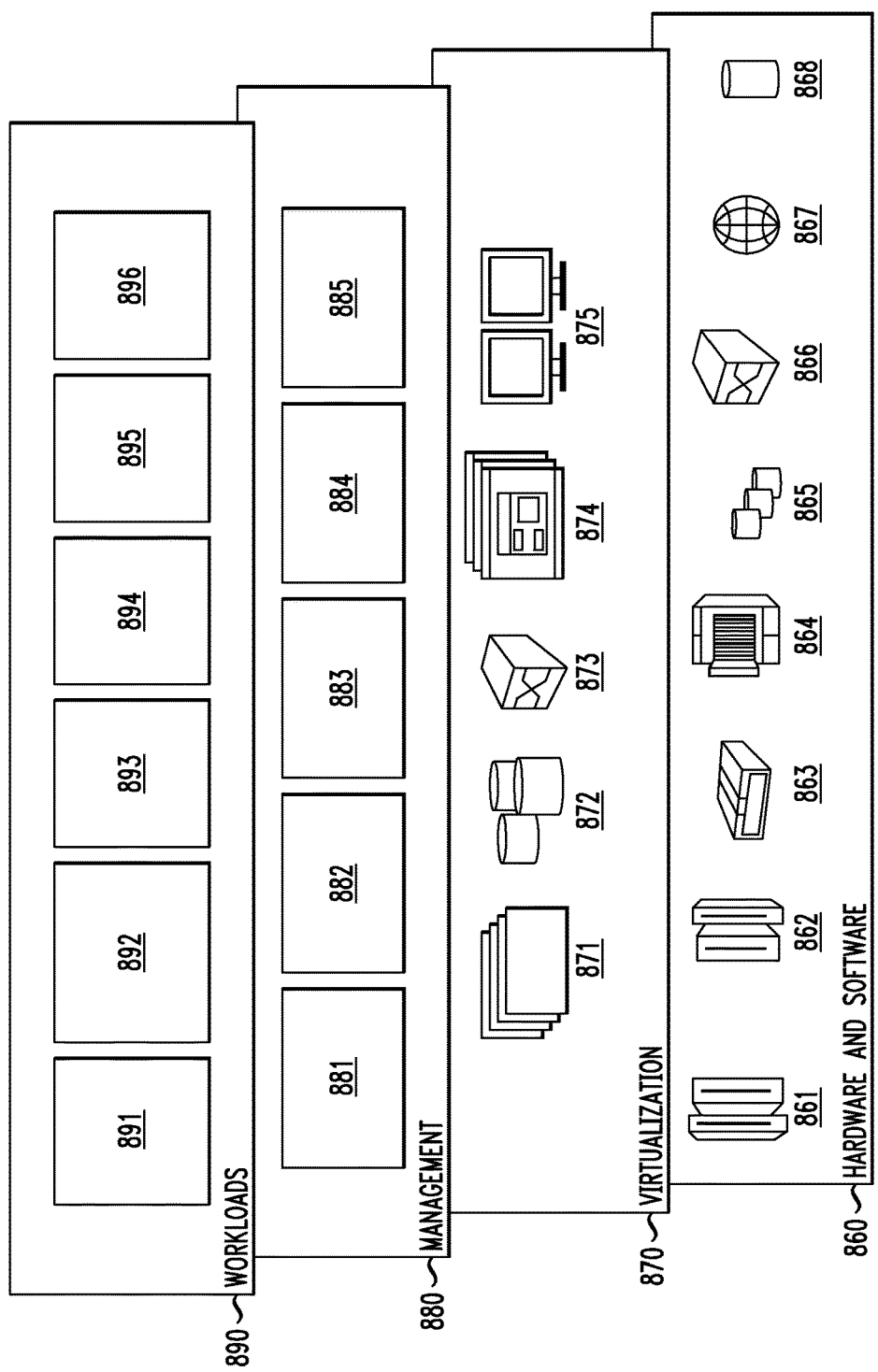
FIG. 8 depicts abstraction model layers according to an embodiment of the invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and object detection and tracking 896, which may implement the functionality described above with respect to FIGS. 1-5.

What is claimed is:

1. A method, comprising the steps of:
   receiving a request to locate one or more convenient communication devices for a recipient of an interaction request;
   issuing a command to search for the recipient at one or more communication devices in response to the recipient not being found;
   receiving information related to the recipient from the one or more communication devices;
   maintaining the received information in a record, wherein the received information comprises proximity information and presence information of the respective communication device relative to the recipient;
   computing a convenience score for each of the one or more communication devices based on the received information and information related to one or more capabilities of the one or more communication devices and the type/modality of the one or more communication devices;
   identifying and preconfiguring a convenient communication device of the one or more communication devices; and
   forwarding the interaction request to the identified convenient communication device of the one or more communication devices based on the one or more computed convenience scores;
   wherein the steps are performed by at least one processor device coupled to a memory.

2. The method of claim 1, wherein the issuing step comprises a local search command to one or more local communication devices.

3. The method of claim 2, further comprising sending a global search command to a server when the information received from the one or more local communication devices indicate absence of the recipient.

4. The method of claim 3, further comprising sending a search command from the server to one or more other local search modules.

5. The method of claim 4, further comprising receiving, at the respective local search module, information related to the recipient from the one or more communication devices.

6. The method of claim 5, further comprising computing, at the respective local search module, the convenience score for each of the one or more communication devices based on the received information.

7. The method of claim 6, further comprising receiving computed convenience scores from the respective local search modules, and identifying the convenient communication device based on the received convenience scores.

8. The method of claim 1, wherein computing the convenience score further comprises utilizing information related to at least one of personal usage history and preference for the recipient.

9. The method of claim 8, wherein the personal usage history and preference for the recipient is determined based on the maintained information.

10. The method of claim 8, further comprising at least one of pre-configuring and pre-loading one or more applications on the one or more communication devices based on at least one of the personal history and preference for the recipient.

11. The method of claim 1, wherein computing the convenience score further comprises utilizing information related to at least one of status of the device, battery life of the device, accessories of the device, preference and time trail of recipient interaction with each of the respective communication device.

12. The method of claim 1, wherein searching for the recipient at one or more communication devices comprises at least one of:
    a biometric-based recognition;
    techniques to compute proximity relationships between the respective device and the recipient; and
    one or more sensors to sense at least one of a location and a locomotive state of the recipient.

13. The method of claim 1, further comprising sending the received information to a server.

14. An apparatus, comprising a memory and a processor operatively coupled to the memory and configured to implement the method of claim 1.

15. An article of manufacture comprising a computer readable storage medium for storing computer readable program code which, when executed, causes a computer to implement the method of claim 1.

16. The method of claim 1, wherein a pre-configured number corresponding to a location is not associated with the one or more communication devices.

17. A method, comprising:
    receiving an interaction request from a first communication device;
    searching for a recipient of the interaction request;
    issuing a search command, in response to the recipient not being found after the searching step, to a local search module to search for one or more communication devices convenient to the recipient; wherein the search command is based on received information comprising proximity information and presence information of the respective communication device relative to the recipient;
    receiving an identity of a convenient communication device based on one or more convenience scores, wherein each convenience score is computed based on the received information and information related to one or more capabilities of the one or more communication devices and the type/modality of the one or more communication devices;

preconfiguring the identified convenient communication device of the one or more communication devices; and forwarding the interaction request to the identified convenient communication device of the one or more communication devices based on the one or more computed convenience scores;

wherein the steps are performed by at least one processor device coupled to a memory.

18. The method of claim 17, wherein a pre-configured number corresponding to a location is not associated with the one or more communication devices.

19. A method, comprising:

receiving a request to search for a recipient of an interaction request;

searching for the recipient in response to the recipient not being found;

collecting proximity and presence information of a respective communication device relative to the recipient based on the searching step;

sending the collected information to one or more local search modules;

computing, at the respective local search module, a convenience score for each of the one or more communication devices based on the collected information and information related to one or more capabilities of the one or more communication devices and the type/modality of the one or more communication devices; and identifying and preconfiguring a convenient communication device of the one or more communication devices; and receiving the interaction request in response to being identified as an identified convenient communication device based on the computed convenience scores;

wherein the steps are performed by at least one processor device coupled to a memory.

20. The method of claim 19, wherein a pre-configured number corresponding to a location is not associated with the one or more communication devices.

* * * * *